United States Patent [19]

Kemp

[11] 4,157,187
[45] Jun. 5, 1979

[54] ROTARY MECHANICAL FACE SEALS

[75] Inventor: John Kemp, Stoke Poges, England

[73] Assignee: Crane Packing Limited, Slough, England

[21] Appl. No.: 855,353

[22] Filed: Nov. 28, 1977

[51] Int. Cl.² ............................................. F16J 15/34
[52] U.S. Cl. .................................................... 277/87
[58] Field of Search ................ 277/85, 86, 87, DIG. 6

[56] References Cited

U.S. PATENT DOCUMENTS

| | | |
|---|---|---|
| 2,644,804 | 7/1953 | Rubin et al. .................. 277/DIG. 6 |
| 3,042,414 | 7/1962 | Tracy ................................ 277/87 |
| 3,776,612 | 12/1973 | Barlow .......................... 277/DIG. 6 |
| 3,870,589 | 3/1975 | Shobert ........................ 277/DIG. 6 |

*Primary Examiner*—Robert I. Smith
*Attorney, Agent, or Firm*—Scrivener, Parker, Scrivener & Clarke

[57] ABSTRACT

A sealing member for sealing an axially movable face seal member to an associated component comprises an annular body of graphite or other predominantly carbon-containing material of U-shape or C-shape in cross-section formed around a supporting annular core.

10 Claims, 5 Drawing Figures

ROTARY MECHANICAL FACE SEALS

This invention relates to rotary mechanical face seals for relatively rotatable components (for example a drive shaft projecting through the wall of a pump housing) of the kind comprising two co-operating face seal members urged into engagement by spring means. One of the two co-operating members must be axially movable, being spring-urged towards the other member, and this axially movable member must be sealed to that component (e.g. a housing or shaft) with which it is associated, yet the means for doing this sealing must be of a low-friction nature in order to allow the spring or springs to overcome easily any frictional resistance offered by those means, whether or not assisted by the addition of hydraulic or pneumatic forces.

For example, where the axially movable member is mounted on a shaft, it is usual to use an O-ring or a wedge-shaped ring, or sometimes bellows to seal it to the shaft.

In known rotary mechanical face seals of the kind set forth employing wedge-shaped rings, commonly known as flexible members, an axial force on the face seal member is transmitted through the flexible member so as to urge that member (by virtue of its wedge shape) into intimate sealing contact with the shaft. Such rings are often made of PTFE because of its low-friction properties and resistance to chemical attack.

A drawback of PTFE is that it is subject to creep, and this tendency increases with temperature and with pressure. It is known to reinforce the PTFE with glass or carbon or even, in severe cases, with asbestos, but whilst reducing the creep the reinforcement increases the coefficient of friction, and in the case of asbestos it restricts the field of use.

It is also known to make such rings of pure graphite, which is good from the friction point of view but is fragile.

The aim of the invention is to provide a form of sealing member for sealing an axially movable face seal member to its associated component without the limitations of existing sealing members and capable of being manufactured in forms to suit new and existing seal constructions.

According to the present invention we provide a sealing member for sealing an axially movable face seal member of a rotary mechanical face seal to an associated component, comprising an annular body of graphite or other predominantly carbon-containing material of U-shape or C-shape in cross-section formed around a supporting annular core.

Pure graphite material is particularly suitable as it has a low coefficient of friction in conjunction with metal surfaces such as steel, it is resistant to most chemicals, it resists deformation at elevated temperatures, and it is substantially non-toxic. However instead of using pure graphite we may mix additives in with it. In particular we may incorporate zinc powder, or another material electro-positive to iron, to provide sacrificial protection to the stainless steel or other ferrous components of the seal assembly.

Any required shape can be wrapped or moulded using the basic graphite powder, milled pieces, sheet or tape. The material may be in a form which is deformable plastically or elastically or both. It is preferably in the form of a compacted particulate graphite body. Another possibility is to use a body of carbon fibre.

An advantage of graphite is that it is unaffected by being exposed to cold water and then later to elevated temperatures. This allows it to be used in, for example a pump which is tested using water but is subsequently to be used in hot oil.

Some embodiments of our invention will now be described, by way of example only, with reference to the accompanying drawings, in which.

Figure 1:
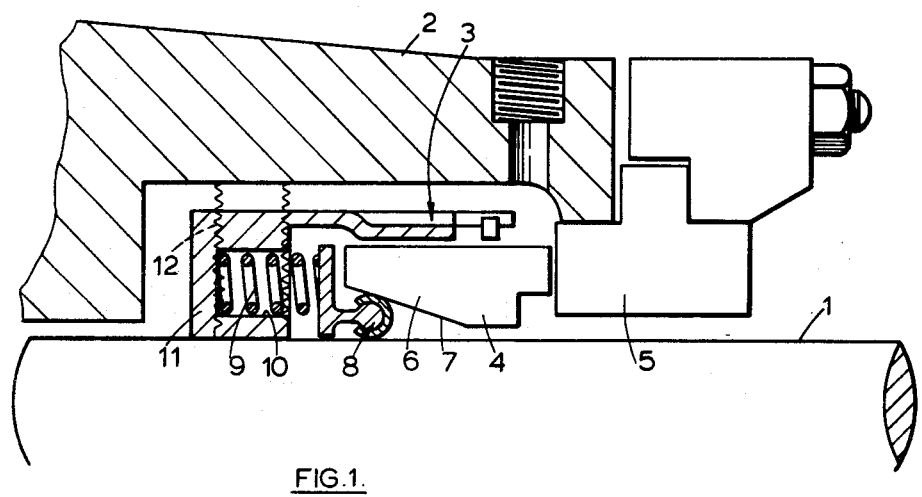
FIG. 1 is a sectional view of a rotary mechanical seal on a pump shaft, the section being taken on an axial plane of the shaft and only a symmetrical half of the shaft and seal being shown.
Figure 2:
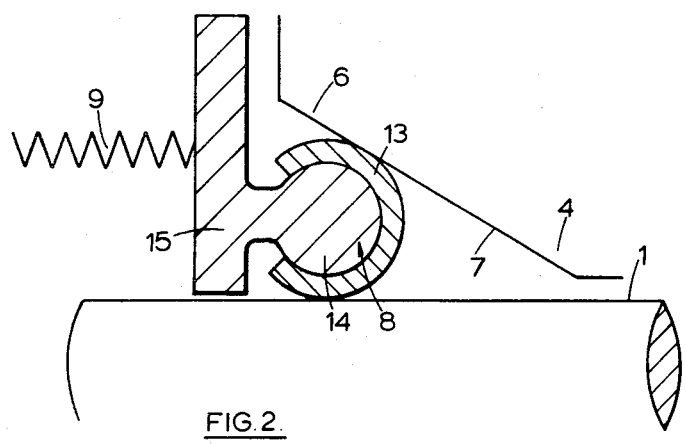
FIG. 2 is an enlarged view of the portion of FIG. 1 showing the seal.

In the embodiment illustrated in FIGS. 1 and 2 a shaft 1 is sealed into a pump housing 2 by means of a rotary mechanical face seal 3. The seal 3 comprises a main axially movable face seal member 4 carried on the shaft 1 and urged axially into contact with a stationary seating member 5 which is secured to the housing 2.

The seal member 4 has a tail portion 6 with a tapered inner face 7 defining a wedge-shaped gap with the shaft 2. A sealing ring 8 is located in the gap and seals the member 4 to the shaft. The sealing ring 8 is urged into sealing engagement with the face 7 of the seal member 4 and the shaft 1 by means of a spring 9. The spring 9 acts through the sealing ring 8 to urge the seal member 4 into engagement with the seating member 5. The spring 9 is mounted in a counterbore 10 of a retainer 11 secured to the shaft 1 by grub screws 12 and acting to locate the seal member 4.

As shown in more detail in FIG. 2, the sealing ring 8 comprises a C-shaped member 13, suitably of graphite or any predominantly carbon-containing material, moulded around a metal core 14 which has a flange 15 to take the thrust of the spring 9. As shown, the cross-section of the C-shaped member embraces more than one-half of the cross-section of the core. The surface of the graphite member 13 forms a seal with the shaft 1 and with the tapered internal surface 7 of the tail portion 7, yet the friction is very low and so, as the seal member 5 wears, the spring 9 is able to advance the member whilst maintaining sealing contact with the shaft 1.

Figure 3:
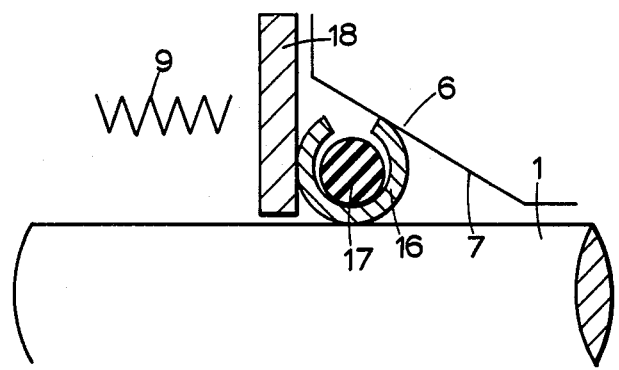
FIG. 3 is a view similar to FIG. 2 showing a modification.

FIG. 3 shows a modified sealing ring 8 in which a C-shaped graphite member 16 is moulded around an O-ring or a garter spring 17 and the spring 9 acts on the ring 8 through a separate thrust ring 18 bearing against the outside of the graphite member 16. The construction and operation is otherwise the same as the embodiment of FIGS. 1 and 2.

Figure 4:
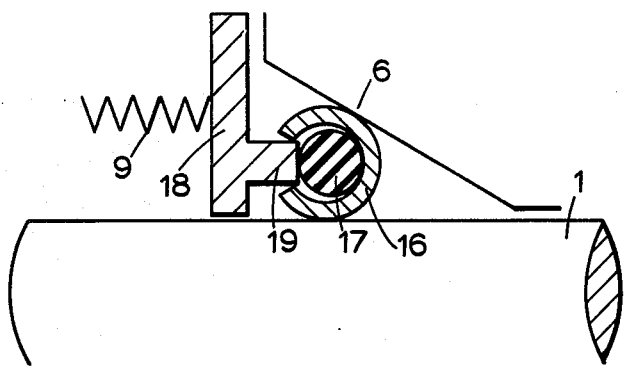
FIG. 4 is a view similar to FIG. 2 showing another modification.

Another alternative version is shown in FIG. 4, in which the sealing ring 8 again comprises a C-shaped graphite member 16 moulded around an O-ring or a garter spring 17 and the thrust ring 18 has an abutment flange 19 which engages the O-ring or garter spring 17 through the gap in the graphite member 16.

Figure 5:
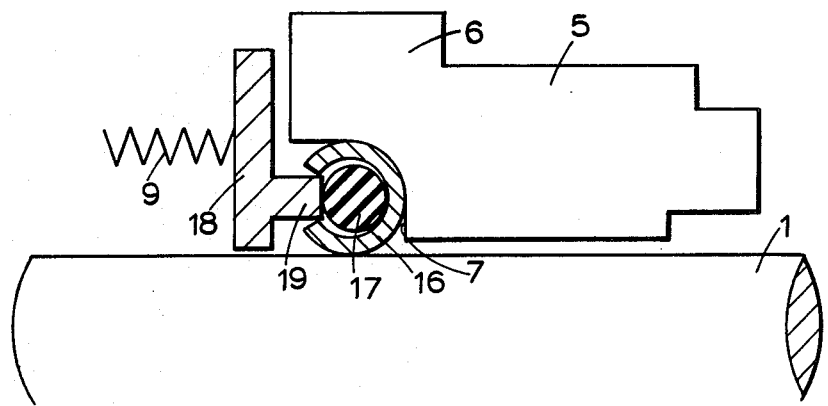
FIG. 5 is a view similar to FIG. 2 showing yet another modification.

The embodiment shown in FIG. 5 is similar to that of FIG. 4 except that the face seal member 5 has a face 7 of arcuate profile rather than a tapered face.

It is emphasised that the gap which the sealing ring 8 according to the invention seals is not necessarily wedge-shaped.

I claim:

1. A sealing member for sealing an axially movable face seal member to an associated component such as a shaft comprising an annular body of graphite material of C-shaped cross-section and a supporting annular core member, said C-shaped cross-section of said annular body member embracing more than one-half of the cross-section of said core member.

2. A sealing member as claimed in claim 1, wherein a material electo-positive to iron is incorporated in powdered form in said graphite material used to form said annular body.

3. A sealing member as claimed in claim 1, wherein said annular body is formed from compacted particulate graphite.

4. A sealing member as claimed in claim 1, wherein said core is of metal.

5. A sealing member as claimed in claim 1, wherein said core comprises a resilient O-ring.

6. A sealing member as claimed in claim 1, wherein said core comprises a garter spring.

7. A rotary mechanical face seal for relatively rotatable components, comprising first and second cooperating seal face members each asssociated with one of said components, said first seal face member being axially movable, spring means urging said first seal face member into sealing engagement with said second seal face member, and a sealing member for sealing said first seal face member to its associated component, said sealing member comprising an annular body of graphite material of C-shaped cross-section and a supporting annular core member, said C-shaped cross-section of said annular body member embracing more than one-half of the cross-section of said core member said spring means acting on said first seal face member through said sealing member.

8. A rotary mechanical face seal as claimed in claim 7, wherein an annular drive ring external of said sealing member forms an abutment for said spring means.

9. A rotary mechanical face seal as claimed in claim 8 wherein said C-shaped annular body has an opening facing towards said drive ring and said drive ring has an abutment flange extending through said opening to engage said annular core.

10. A rotary mechanical face seal as claimed in claim 9, wherein said annular core is formed integrally with said abutment flange.

* * * * *